United States Patent
Gong

(10) Patent No.: US 8,825,917 B2
(45) Date of Patent: Sep. 2, 2014

(54) METHOD, SYSTEM AND DEVICE FOR ENABLING USB DATA CARD WITH USB FLASH DRIVE FUNCTION TO HIBERNATE

(75) Inventor: Wenqiang Gong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/984,778

(22) PCT Filed: Apr. 20, 2011

(86) PCT No.: PCT/CN2011/073075
§ 371 (c)(1),
(2), (4) Date: Aug. 9, 2013

(87) PCT Pub. No.: WO2012/106853
PCT Pub. Date: Aug. 16, 2012

(65) Prior Publication Data
US 2013/0326093 A1 Dec. 5, 2013

(30) Foreign Application Priority Data
Feb. 12, 2011 (CN) .......................... 2011 1 0036942

(51) Int. Cl.
G06F 3/00 (2006.01)
G06F 13/00 (2006.01)
G06F 13/10 (2006.01)
G06F 1/32 (2006.01)

(52) U.S. Cl.
CPC ............... G06F 13/10 (2013.01); G06F 1/325 (2013.01); *Y02B 60/32* (2013.01)
USPC ................................ 710/14; 710/10; 710/18

(58) Field of Classification Search
None
See application file for complete search history.

(56) References Cited

U.S. PATENT DOCUMENTS 8,321,702 B2 * 11/2012 Kaneko et al. ................ 713/320
2007/0192643 A1 8/2007 Li et al.

(Continued)

FOREIGN PATENT DOCUMENTS

| CN | 1963725 A | 5/2007 |
|---|---|---|
| CN | 101021741 A | 8/2007 |
| CN | 201118713 Y | 9/2008 |
| CN | 101630191 A | 1/2010 |
| CN | 101840263 A | 9/2010 |

OTHER PUBLICATIONS

International Search Report in international application No. PCT/CN2011/073075, mailed on Nov. 17, 2011. (4 pages).

(Continued)

*Primary Examiner* — Zachary K Huson
(74) *Attorney, Agent, or Firm* — Oppedahl Patent Law Firm LLC

(57) ABSTRACT

A method, system and device for enabling a Universal Serial Bus (USB) data card with a USB flash drive function to hibernate are disclosed. The USB data card comprises two kinds of USB data card configuration information, the first USB data card configuration information of which is configuration information of the USB data card with the USB flash drive function, and the second USB data card configuration information of which is configuration information of the USB data card without the USB flash drive function. The USB data card sends the first USB data card configuration information to a host at first during enumeration with the host, and then sends the second USB data card configuration information to the host after receiving a configuration information switching instruction from the host and hibernates. The USB data card with the USB flash drive function can hibernate automatically according to the USB interface specification, thereby reducing the power consumption.

13 Claims, 5 Drawing Sheets

(56) References Cited

U.S. PATENT DOCUMENTS

| | | |
|---|---|---|
| 2009/0172208 A1 | 7/2009 | Lee et al. |
| 2010/0077235 A1 | 3/2010 | Lee et al. |
| 2010/0241883 A1 | 9/2010 | Liao et al. |
| 2011/0202692 A1* | 8/2011 | Chang et al. ............ 710/16 |

OTHER PUBLICATIONS

English Translation of the Written Opinion of the International Search Authority in international application No. PCT/CN2011/073075, mailed on Nov. 17, 2011. (4 pages).

* cited by examiner

US 8,825,917 B2

METHOD, SYSTEM AND DEVICE FOR ENABLING USB DATA CARD WITH USB FLASH DRIVE FUNCTION TO HIBERNATE

TECHNICAL FIELD

The disclosure relates to the technical field of communications, in particular to a method, system and device for enabling a Universal Serial Bus (USB) data card with a USB flash drive function to hibernate.

BACKGROUND

With the continuous maturity of the 3rd-Generation (3G) wireless communication technology, a 3G wireless data card is being widely used. The internet connection function of the wireless data card is mainly implemented by the 3G network of the telecom operator. At present, the data card is mostly of a USB interface form, so as to be generally called the USB data card. To enrich the application of the USB data card, most of the USB data cards are provided with a USB flash drive function now; therefore, a user can store contents downloaded from the network to the USB data card when surfing the internet by the USB data card and does not need to carry additional USB flash drives any more, thereby bringing much convenience to the user.

At present, the USB data card is mainly used by the user for a laptop with limited battery resources, therefore, a requirement is raised to the USB data card, namely, it is better to enable the USB data card to hibernate out of the network connection hour of the user, so as to reduce the power consumption effectively and improve the standby duration of the laptop.

FIG. 1 is a diagram showing the structure of a host and a USB data card in the related art, as shown in FIG. 1, a USB host controller and a User Interface (UI) are located in the host, and both the USB data card and the USB host controller have a USB flash drive function and a data card function.

The USB flash drive function conforms to the USB mass storage specification which requires that the USB host controller should give a status query instruction to the USB data card periodically, so that the host and the USB data card may periodically transmit data with each other. However, the USB interface specification has a specific device hibernation function, namely, the host may notify a USB device to hibernate in case of no data exchange within a specific time interval. At present, the USB data card generally supports the hibernation way of the USB.

Therefore, the conventional USB data card with the USB flash drive function cannot hibernate, so as to increase the power consumption.

SUMMARY

In view of this, the embodiments of the disclosure provide a method, system and device for enabling a USB data card with a USB flash drive function to hibernate, in order to solve the problem that the conventional USB data card with the USB flash drive function cannot hibernate to increase the power consumption.

An embodiment of the disclosure provides a method for enabling a USB data card with a USB flash drive function to hibernate, wherein the USB data card includes first USB data card configuration information and second USB data card configuration information; the first USB data card configuration information is configuration information of the USB data card with the USB flash drive function, and the second USB data card configuration information is configuration information of the USB data card without the USB flash drive function; and the method includes:

sending, by the USB data card, the first USB data card configuration information to a host during enumeration with the host;

receiving, by the USB data card, a configuration information switching instruction sent from the host; and sending, by the USB data card, the second USB data card configuration information to the host according to the configuration information switching instruction and then hibernating.

An embodiment of the disclosure provides a system for enabling a USB data card with a USB flash drive function to hibernate, which includes the USB data card and a host; wherein the USB data card includes first USB data card configuration information and second USB data card configuration information; the first USB data card configuration information is configuration information of the USB data card with the USB flash drive function, and the second USB data card configuration information is configuration information of the USB data card without the USB flash drive function;

the USB data card is configured to send the first USB data card configuration information to the host during enumeration with the host, to receive a configuration information switching instruction sent from the host, and to send the second USB data card configuration information to the host according to the configuration information switching instruction and then hibernate; and the host is configured to receive the configuration information from the USB data card, and to send the configuration information switching instruction to the USB data card.

An embodiment of the disclosure provides a device for enabling a USB data card with a USB flash drive function to hibernate, which includes first USB data card configuration information and second USB data card configuration information, wherein the first USB data card configuration information is configuration information of the USB data card with the USB flash drive function, and the second USB data card configuration information is configuration information of the USB data card without the USB flash drive function; which further includes:

a storage module configured to store the first and second USB data card configuration information;

an enumeration module configured to send the first USB data card configuration information to the host during enumeration with the host, and to send the second USB data card configuration information to the host according to a notification from a receiving and switching module; and the receiving and switching module configured to notify the enumeration module to send the second USB data card configuration information to the host according to a received configuration information switching instruction sent from the host;

and then, the device hibernates.

According to the method, system and device for enabling a USB data card with a USB flash drive function to hibernate, the USB data card includes the first USB data card configuration information and the second USB data card configuration information, wherein the first USB data card configuration information is configuration information of the USB data card with the USB flash drive function, and the second USB data card configuration information is configuration information of the USB data card without the USB flash drive function; the USB data card sends the first USB data card configuration information to the host during enumeration with the host, and sends the second USB data card configuration information to the host when receiving a configuration information switching instruction from the host and then hibernates. The USB data card in the embodiments of the disclosure includes the configuration information of the USB data card with the USB flash drive function and the configuration information of the USB data card without the USB flash drive function; the configuration information of the USB data card with the USB flash drive function is enumerated at first; after the configuration information switching instruction is received from the host, the configuration information of the USB data card without the USB flash drive function is sent to the host; and the USB data card without the USB flash drive function can hibernate automatically according to the USB interface specification, thereby reducing the power consumption.

DETAILED DESCRIPTION

To reduce the power consumption of a host, embodiments of the disclosure provide a method, system and device for enabling a USB data card with a USB flash drive function to hibernate. In the method, the USB data card with the USB flash drive function includes two kinds of configuration information: first USB data card configuration information and second USB data card configuration information, wherein the first USB data card configuration information is configuration information of the USB data card with the USB flash drive function, and the second USB data card configuration information is configuration information of the USB data card without the USB flash drive function.

To make the technical problem to be solved by the disclosure, the technical scheme and the advantages more clear and obvious, the disclosure is further described below by combining with the drawings and embodiments in detail. It should be understood that the specific embodiments described herein are only intended to explain the disclosure instead of limiting the disclosure.

Figure 1:
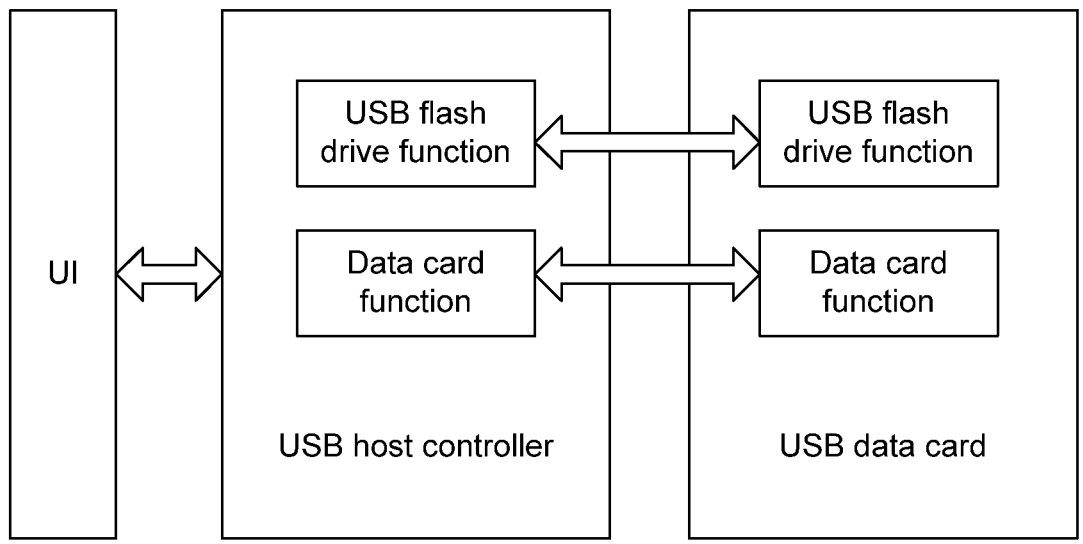
FIG. 1 is a diagram showing the structure of a host and a USB data card in the related art.
Figure 2:
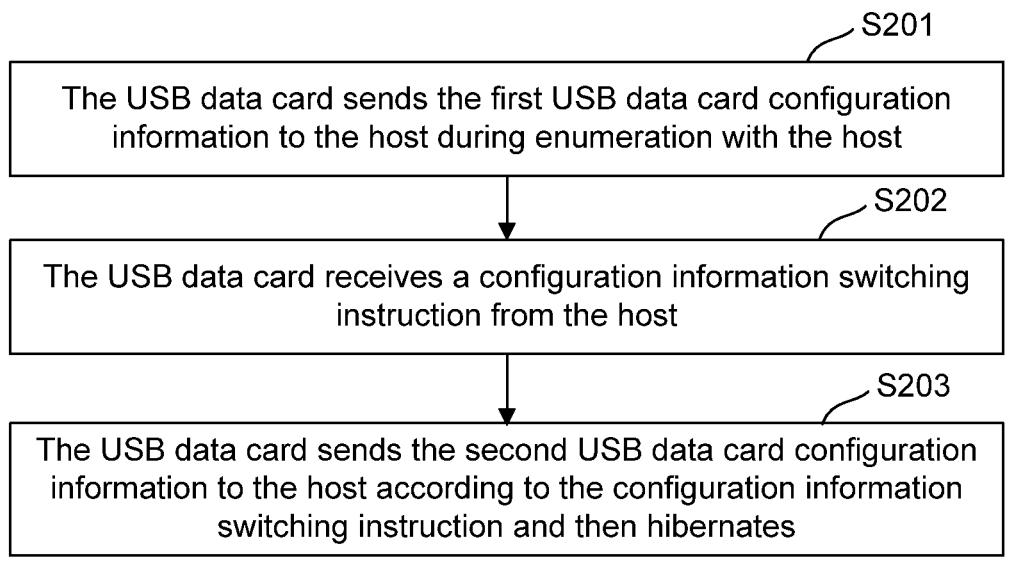
FIG. 2 is a flowchart of enabling a USB data card with a USB flash drive function to hibernate in an embodiment of the disclosure.

FIG. 2 is a flowchart of enabling a USB data card with a USB flash drive function to hibernate in an embodiment of the disclosure, as shown in FIG. 2, which includes the following steps:

Step 201: the USB data card sends the first USB data card configuration information to the host during enumeration with the host.

During enumeration with the host, the USB data card sends the first USB data card configuration information, i.e., the configuration information of the USB data card with the USB flash drive function, to the host at first.

Step 202: the USB data card receives a configuration information switching instruction from the host.

The step that the host sends the configuration information switching instruction includes:

the host judges whether operation data information for the USB data card is received within a set time duration; and if not, the configuration information switching instruction is sent to the USB data card.

Step 203: the USB data card sends the second USB data card configuration information to the host according to the configuration information switching instruction and then hibernates.

In step 201, the current USB data card enumerates the data card with the USB flash drive function to the host, so the host considers the USB data card to be the one with the USB flash drive function at the moment; in step 203, the USB data card further makes an enumeration with the host according to the received configuration information switching instruction from the host, and sends its own second USB data card configuration information, i.e., the configuration information of the USB data card without the USB flash drive function, to the host. At the moment, the USB data card has enumerated the second USB data card configuration information to the host, so the host considers the USB data card to be the one without the USB flash drive function. The USB data card and the host conform to the USB interface specification, therefore, the host will notify the USB data card to hibernate if no data is exchanged within the specified time interval, thereby enabling the USB data card with the USB flash drive function to hibernate.

Figure 3:
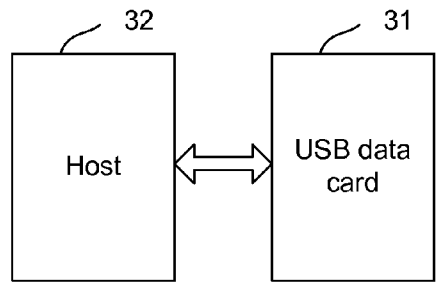
FIG. 3 is a diagram showing the structure of a system for enabling a USB data card with a USB flash drive function to hibernate in an embodiment of the disclosure.

FIG. 3 is a diagram showing the structure of a system for enabling a USB data card with a USB flash drive function to hibernate in an embodiment of the disclosure. The USB data card 31 in the system includes first USB data card configuration information and second USB data card configuration information, wherein the first USB data card configuration information is configuration information of the USB data card with the USB flash drive function, and the second USB data card configuration information is configuration information of the USB data card without the USB flash drive function; and the system includes:

the USB data card 31 configured to send the first USB data card configuration information to the host 32 during enumeration with the host 32, to receive a configuration information switching instruction from the host 32, and to send the second USB data card configuration information to the host 32 according to the configuration information switching instruction and then hibernate; and the host 32 configured to receive the configuration information sent from the USB data card 31, and to send the configuration information switching instruction to the USB data card 31.

Figure 4:
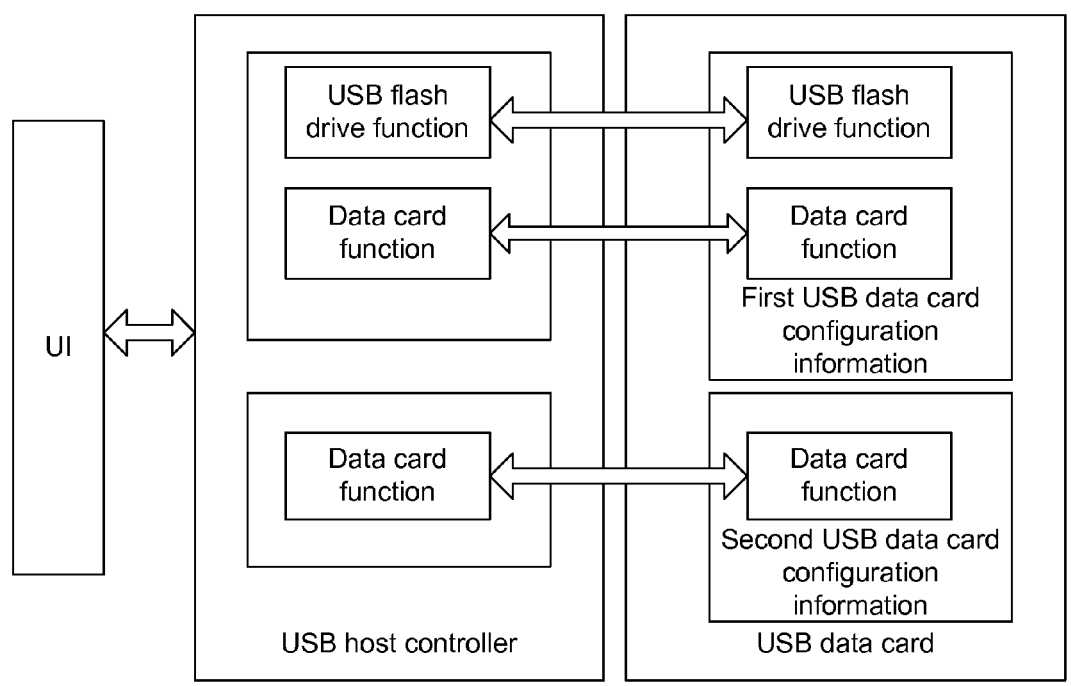
FIG. 4 is a diagram showing the structure of a host and a USB data card with a USB flash drive function in an embodiment of the disclosure.

Specifically, FIG. 4 is a diagram showing the structure of a host and a USB data card with a USB flash drive function in an embodiment of the disclosure, as shown in FIG. 4, a UI and a USB host controller are located in the host; the USB data card with the USB flash drive function includes first USB data card configuration information and second USB data card configuration information, wherein the first USB data card configuration information is configuration information of the USB data card with the USB flash drive function, namely, the host determines that the USB data card is the one with both the USB flash drive function and the data card function after the USB data card enumerates the first USB data card configuration information to the host, and the host determines that the USB data card is the one without the USB flash drive function, i.e., the one only with the data card function, after the USB data card enumerates the second USB data card configuration information to the host.

When the USB data card is inserted to a USB interface of the host, the USB data card makes an enumeration with the host and sends its own first USB data card configuration information to the host; the USB host controller of the host determines that the USB data card has the USB flash drive function and the data card function after receiving the first USB data card configuration information from the USB data card. After determining the function of the USB data card through the USB host controller, the UI of the host judges whether operation data information for the USB data card is received within the set time duration, if so, the operation data information is sent to the USB data card, otherwise, a configuration information switching instruction is sent to the USB data card.

After receiving the configuration information switching instruction from the UI of the host, the USB data card further makes an enumeration with the host, and sends its own second USB data card configuration information to the host; the USB host controller of the host determines that the USB data card only has the data card function after receiving the second USB data card configuration information from the USB data card. The UI of the host determines the function of the USB data card through the USB host controller. At the moment, the USB data card only has the data card function, so the bus between the USB data card and the USB host controller may hang automatically when the operation data information is not detected within the set time interval, and the USB data card hibernates, thereby enabling the USB data card with the USB flash drive function to hibernate.

Figure 5:
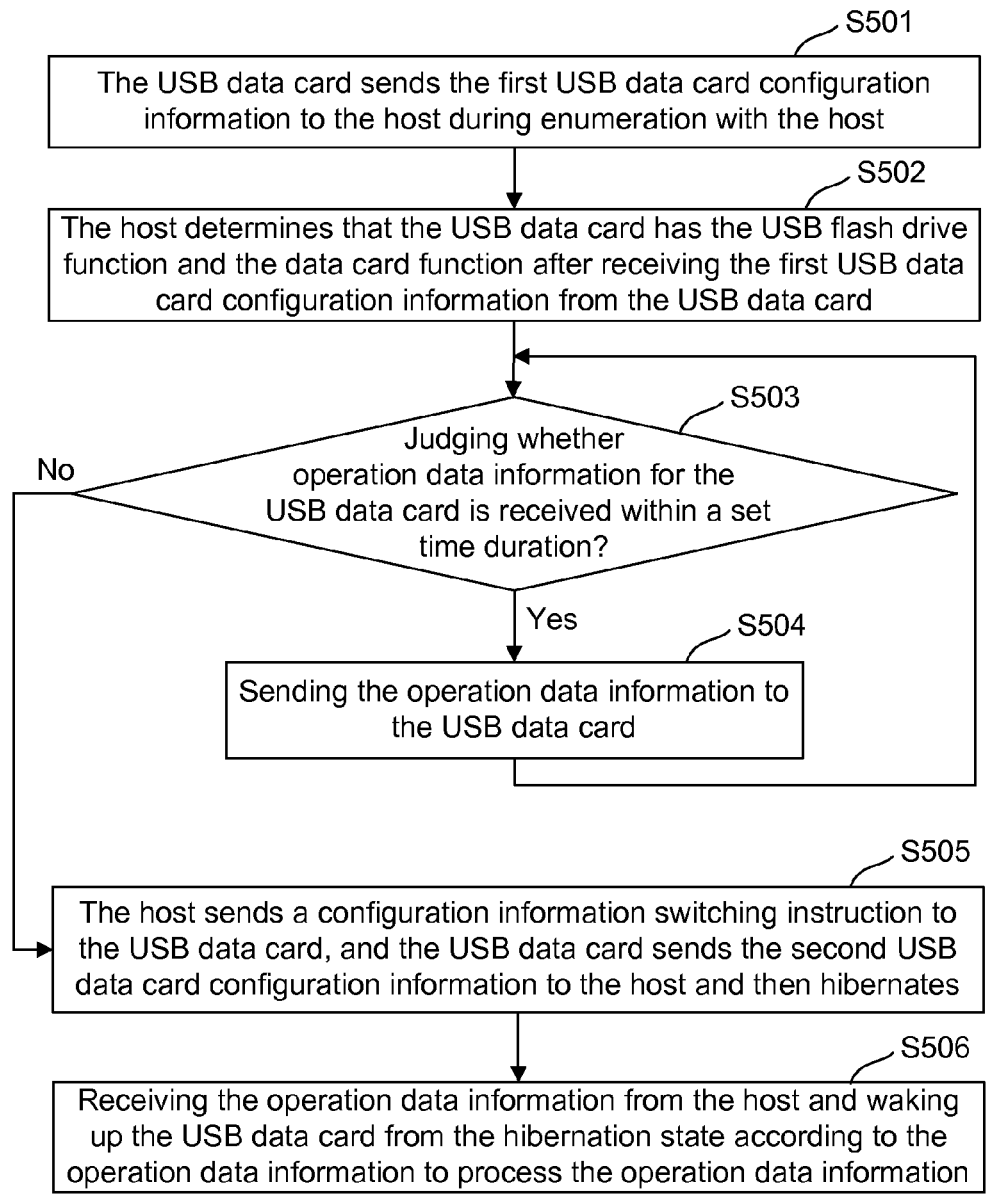
FIG. 5 shows the process of enabling a USB data card with a USB flash drive function to hibernate and be waken up from the hibernation state in an embodiment of the disclosure.

The data card with the USB flash drive function in the embodiment of the disclosure can be further waken up from the hibernation state after hibernating. FIG. 5 shows the process of enabling a USB data card with a USB flash drive function to hibernate and be waken up from the hibernation state in an embodiment of the disclosure, and the process includes the following steps:

Step 501: the USB data card sends the first USB data card configuration information to the host during enumeration with the host.

Step 502: the host determines that the USB data card has the USB flash drive function and the data card function after receiving the first USB data card configuration information from the USB data card.

Step 503: the host judges whether operation data information for the USB data card is received within a set time duration, if so, step 504 is executed, otherwise, step 505 is executed.

Step 504: the host sends the operation data information to the USB data card, and then step 503 is executed.

Step 505: the host sends a configuration information switching instruction to the USB data card, and the USB data card sends the second USB data card configuration information to the host and then hibernates.

Step 506: the USB data card receives the operation data information from the host and is waken up from the hibernation state according to the operation data information to process the operation data information.

Specifically, when receiving the operation data information for the USB data card, the UI of the host sends the operation data information to the USB data card; and the USB data card is waken up from the hibernation state according to the operation data information to process the operation data information.

After the USB data card is waken up from the hibernation state, it is possible to determine which configuration information is specifically enumerated to the host according to the operation data information, in order to process the operation data information. The USB data card judges whether the operation data information is that for the data card, if so, it is waken up from the hibernation state, sends the second USB data card configuration information to the host, and then processes the operation data information, otherwise, it is waken up from the hibernation state, sends the first USB data card configuration information to the host, and then processes the operation data information.

Or, an embodiment of the disclosure aims at the transparency of using the USB data card for a user. Before the hibernation state of the USB data card, the host considers the USB data card to be the one with the USB flash drive function when the user uses the USB data card; therefore, after the host receives operation data information for the USB data card and sends it to the USB data card, the USB data card can also directly send the first USB data card configuration information to the host without making a judgment, thereby enhancing the transparency of using the USB data card for the user.

Figure 6:
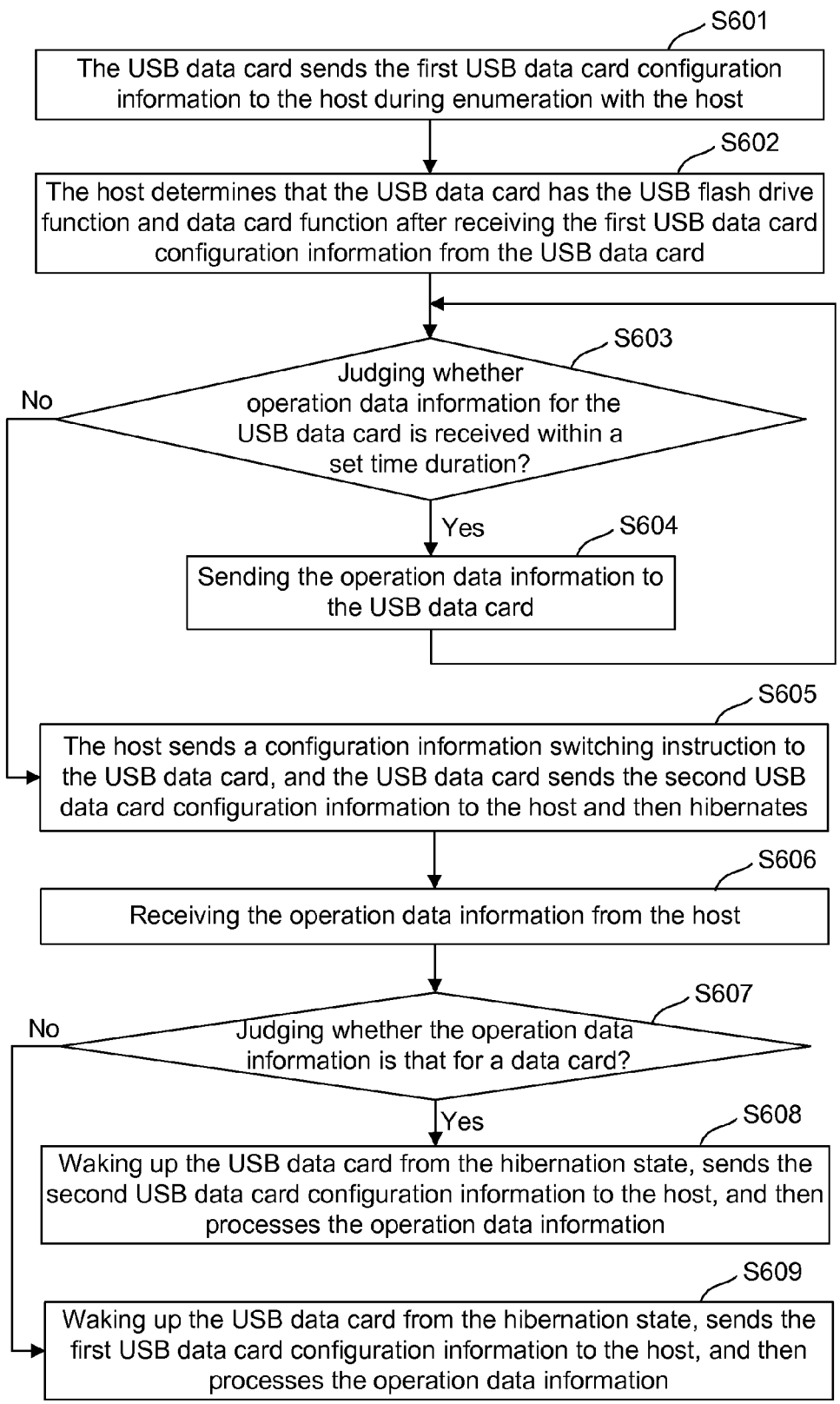
FIG. 6 shows the detailed process of enabling a USB data card with a USB flash drive function to hibernate and be waken up from the hibernation state in an embodiment of the disclosure.

FIG. 6 shows the detailed process of enabling a USB data card with a USB flash drive function to hibernate and be waken up from the hibernation state in an embodiment of the disclosure, and the process includes the following steps:

Step 601: the USB data card sends the first USB data card configuration information to the host during enumeration with the host.

Step 602: the host determines that the USB data card has the USB flash drive function and data card function after receiving the first USB data card configuration information from the USB data card.

Step 603: the host judges whether operation data information for the USB data card is received within a set time duration, if so, step 604 is executed, otherwise, step 605 is executed.

Step 604: the host sends the operation data information to the USB data card, and then step 603 is executed.

Step 605: the host sends a configuration information switching instruction to the USB data card, and the USB data card sends the second USB data card configuration information to the host and then hibernates.

Step 606: the USB data card receives the operation data information from the host.

Step 607: the USB data card judges whether the operation data information is that for the data card, if so, step 608 is executed, otherwise, step 609 is executed.

Step 608: the USB data card is waken up from the hibernation state, sends the second USB data card configuration information to the host, and then processes the operation data information.

Step 609: the USB data card is waken up from the hibernation state, sends the first USB data card configuration information to the host, and then processes the operation data information.

As seen from the embodiments above, in the embodiment, the USB data card judges whether the operation data information is that for the data card or that for the USB flash drive after receiving it from the host; when the operation data information is that for the data card, the USB data card sends its own second USB data card configuration information to the host so that the host determines that the USB data card does not have the USB flash drive function; and then, the USB data card processes the operation data information. When the operation data information is that for the USB flash drive, the second USB data card configuration information of the USB data card is configuration information of the USB data card without the USB flash drive function, so the USB data card sends its own first USB data card configuration information to the host after being waken up from the hibernation state; and the first USB data card configuration information is configuration information of the USB data card with the USB flash drive function and the data card function, so the USB data card has the USB flash drive function and the data card function to process the operation data information.

Figure 7:
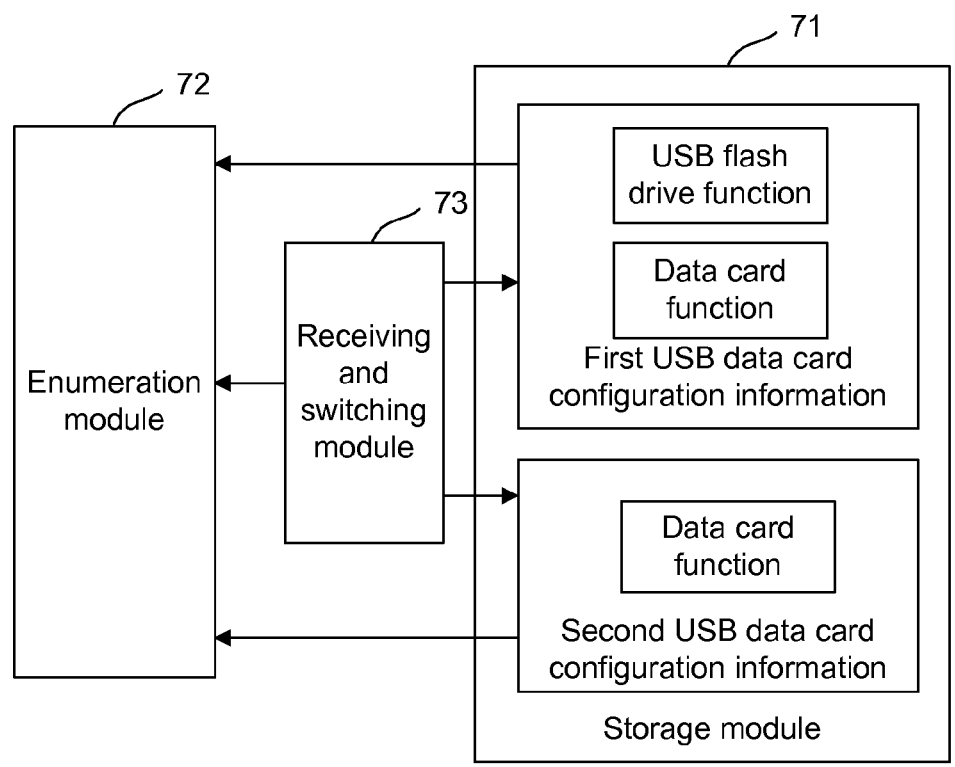
FIG. 7 is a diagram showing the structure of a device for enabling a USB data card with a USB flash drive function to hibernate in an embodiment of the disclosure.

FIG. 7 is a diagram showing the structure of a device for enabling a USB data card with a USB flash drive function to hibernate in an embodiment of the disclosure, and the device includes:

a storage module 71 configured to store first and second USB data card configuration information, wherein the first USB data card configuration information is configuration information of the USB data card with the USB flash drive function, and the second USB data card configuration information is configuration information of the USB data card without the USB flash drive function;

an enumeration module 72 configured to send the first USB data card configuration information to the host during enumeration with the host, and to send the second USB data card configuration information to the host according to a notification from a receiving and switching module; and the receiving and switching module 73 configured to notify the enumeration module to send the second USB data card configuration information to the host according to a received configuration information switching instruction sent from the host;

and then, the device hibernates.

In the device, the receiving and switching module 73 is further configured to receive operation data information from the host, to send the operation data information to the corresponding data card, and to wake up the data card from the hibernation state to process the operation data information.

The receiving and switching module 73 is specifically configured to judge whether the operation data information is that for the data card, if so, it wakes up the device from the hibernation state and notifies the enumeration module to send the second USB data card configuration information to the host, otherwise, it notifies the enumeration module to send the first USB data card configuration information to the host.

According to the method, system and device for enabling the USB data card with the USB flash drive function to hibernate provided by the embodiments of the disclosure, the USB data card includes the first USB data card configuration information and the second USB data card configuration information, wherein the first USB data card configuration information is configuration information of the USB data card with the USB flash drive function, and the second USB data card configuration information is configuration information of the USB data card without the USB flash drive function; the USB data card sends the first USB data card configuration information to the host during enumeration with the host and the second USB data card configuration information to the host when receiving a configuration information switching instruction from the host and then hibernates. The USB data card in the embodiments of the disclosure includes the configuration information of the USB data card with the USB flash drive function and the configuration information of the USB data card without the USB flash drive function; although the configuration information of the USB data card with the USB flash drive function is enumerated at first, after the configuration information switching instruction is received from the host, the configuration information of the USB data card without the USB flash drive function is sent to the host; and the USB data card without the USB flash drive function can hibernate automatically according to the USB interface specification, thereby reducing the power consumption.

What described above describes the preferred embodiments of the disclosure, as shown above, it should be understood that the disclosure is not limited to the form disclosed here and shall not be regarded as the exclusion of other embodiments, so that it can be applied to various other combinations, modifications and environments and can be modified by the instruction above or the technology or knowledge in the related fields within the concept scope of the text. But the change and variation made by those skilled in the art within the spirit and scope of the disclosure shall be within the scope of protection of the claims of the disclosure.

What is claimed is:

1. A method for enabling a Universal Serial Bus (USB) data card with a USB flash drive function to hibernate, wherein the USB data card comprises first USB data card configuration information and second USB data card configuration information; the first USB data card configuration information is configuration information of the USB data card with the USB flash drive function, and the second USB data card configuration information is configuration information of the USB data card without the USB flash drive function; and the method comprising:

sending, by the USB data card, the first USB data card configuration information to a host during enumeration with the host;

receiving, by the USB data card, a configuration information switching instruction sent from the host; and sending, by the USB data card, the second USB data card configuration information to the host according to the configuration information switching instruction and then hibernating.

2. The method according to claim 1, wherein the host sending a configuration information switching instruction comprises:

sending, by the host, the configuration information switching instruction to the USB data card when it is determined that operation data information for the USB data card is not received within a set time duration.

3. The method according to claim 1, further comprising:

receiving, by the USB data card, operation data information sent from the host; and waking up the USB data card from a hibernation state according to the operation data information to process the operation data information.

4. The method according to claim 3, wherein the waking up the USB data card from a hibernation state according to the operation data information to process the operation data information comprises:

judging whether the operation data information is that for a data card;

if so, waking up the USB data card from the hibernation state, and sending the second USB data card configuration information to the host; and otherwise, waking up the USB data card from the hibernation state, and sending the first USB data card configuration information to the host.

5. A system for enabling a Universal Serial Bus (USB) data card with a USB flash drive function to hibernate, comprising the USB data card and a host; wherein the USB data card comprises first USB data card configuration information and second USB data card configuration information; the first USB data card configuration information is configuration information of the USB data card with the USB flash drive function, and the second USB data card configuration information is configuration information of the USB data card without the USB flash drive function;

the USB data card is configured to send the first USB data card configuration information to the host during enumeration with the host, to receive a configuration information switching instruction sent from the host, and to send the second USB data card configuration information to the host according to the configuration information switching instruction and then hibernate; and the host is configured to receive the configuration information from the USB data card, and to send the configuration information switching instruction to the USB data card.

6. The system according to claim 5, wherein the host is further configured to judge whether operation data information for the USB data card is received within a set time duration, and to send the configuration information switching instruction to the USB data card when the operation data information is not received.

7. The system according to claim 5, wherein the USB data card is further configured to judge whether the operation data information is that for a data card, to wake up itself from a hibernation state and send the second USB data card configuration information to the host when the operation data information is that for a data card, and to wake up itself from the hibernation state and send the first USB data card configuration information to the host when the operation data information is not that for a data card.

8. A device for enabling a Universal Serial Bus (USB) data card with a USB flash drive function to hibernate, comprising first USB data card configuration configuration information and second USB data card configuration information, wherein the first USB data card configuration information is configuration information of the USB data card with the USB flash drive function, and the second USB data card configuration information is configuration information of the USB data card without the USB flash drive function; further comprising:

a storage module configured to store the first and second USB data card configuration information;

an enumeration module configured to send the first USB data card configuration information to the host during enumeration with the host, and to send the second USB data card configuration information to the host according to a notification from a receiving and switching module; and the receiving and switching module configured to notify the enumeration module to send the second USB data card configuration information to the host according to a received configuration information switching instruction sent from the host.

9. The device according to claim 8, wherein the receiving and switching module is further configured to receive operation data information from the host, to send the operation data information to the corresponding data card, and to wake up the data card from a hibernation state to process the operation data information.

10. The device according to claim 9, wherein the receiving and switching module is specifically configured to judge whether the operation data information is that for a data card, to wake up the device from the hibernation state and notify the enumeration module to send the second USB data card configuration information to the host when the operation data information is that for a data card, and to notify the enumeration module to send the first USB data card configuration information to the host when the operation data information is not that for a data card.

11. The method according to claim 2, further comprising:
receiving, by the USB data card, operation data information sent from the host; and
waking up the USB data card from a hibernation state according to the operation data information to process the operation data information.

12. The method according to claim 11, wherein the waking up the USB data card from a hibernation state according to the operation data information to process the operation data information comprises:
judging whether the operation data information is that for a data card;
if so, waking up the USB data card from the hibernation state, and sending the second USB data card configuration information to the host; and
otherwise, waking up the USB data card from the hibernation state, and sending the first USB data card configuration information to the host.

13. The system according to claim 6, wherein the USB data card is further configured to judge whether the operation data information is that for a data card, to wake up itself from a hibernation state and send the second USB data card configuration information to the host when the operation data information is that for a data card, and to wake up itself from the hibernation state and send the first USB data card configuration information to the host when the operation data information is not that for a data card.

* * * * *